E. THOMSON.
PROPELLING SHIPS BY POLYPHASE ELECTRIC CURRENT.
APPLICATION FILED JAN. 16, 1911.
1,118,382.
Patented Nov. 24, 1914.
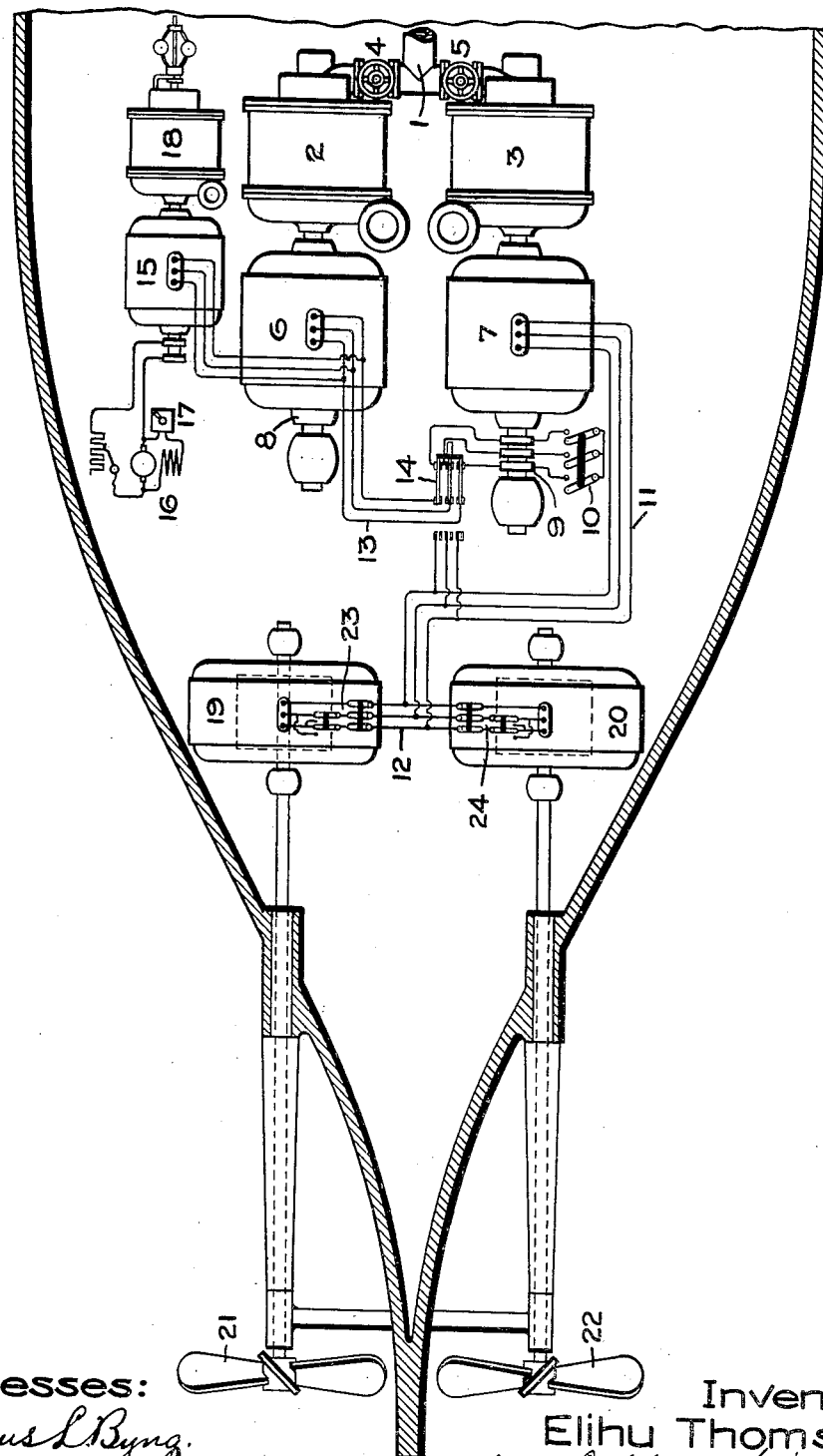
Witnesses:
Marcus L. Byng.
J. Ellis Ellis.
Inventor,
Elihu Thomson,
by Albert G. Davis
Att'y.

UNITED STATES PATENT OFFICE.

ELIHU THOMSON, OF SWAMPSCOTT, MASSACHUSETTS, ASSIGNOR TO GENERAL ELECTRIC COMPANY, A CORPORATION OF NEW YORK.

PROPELLING SHIPS BY POLYPHASE ELECTRIC CURRENT.

1,118,382.  Specification of Letters Patent.  Patented Nov. 24, 1914.

Application filed January 16, 1911. Serial No. 602,925.

*To all whom it may concern:*

Be it known that I, ELIHU THOMSON, a citizen of the United States, residing at Swampscott, county of Essex, State of Massachusetts, have invented certain new and useful Improvements in Propelling Ships by Polyphase Electric Current.

This invention relates to the propulsion of vessels by means of electric motors supplied with current from electric generators driven by high-speed, high-economy turbine engines or other prime movers.

The object of the invention is to take advantage of the economy of space, material and steam afforded by turbine engines, and enable the control of the speed of propulsion to be accomplished while preserving the high and therefore economical speed of the prime mover which actuates the plant.

Another object of the invention is to facilitate maneuvering by reversing the direction of rotation of one or both of the propellers, when a pair is employed, while still maintaining the high speed and economy of the main turbines.

These objects are effected by the use of electric motors for driving the propellers, the generators for supplying them with current being driven by the main turbines.

In the present invention I employ a plurality of polyphase motors, by preference three-phase induction motors, each driving one of a pair or more of propeller screws. The motors are multi-polar, the number of poles being a multiple of those in the generators, so that said motors run at less speed than said generators, and their speed at a maximum is adapted to the most efficient work of the propellers. The motors are usually provided with rotors of the squirrel-cage type. Their stators are preferably three-phase in winding, receiving current from one or more generators driven at comparatively high speed by steam turbines direct connected. These generators are of the induction type, so called, having rotors provided with closed windings, preferably of the squirrel cage type.

In order to set the frequencies in the three-phase windings of their stators, an auxiliary synchronous generator driven by a third and smaller turbine is employed. Its field magnet is rotating, and is preferably of the bi-polar type excited by a continuous current exciter. Suitable control apparatus is provided for varying the voltage of the exciter as may be required. Other apparatus is furnished for cutting off one or the other generator, and also for cutting out one or the other or both motors, and furthermore for interchanging the phases of two of the three leads conveying current thereto so as to reverse at will one or the other of said motors, or both of said motors, to facilitate maneuvering, steering and backing.

The accompanying drawing is a diagram illustrating a system of ship propulsion in accordance with my invention.

Steam is supplied through the main 1 which branches to the plurality of high speed high economy turbines, the drawing showing two such turbines, 2 and 3, the admission of the steam being suitably controlled and governed. Throttle valves 4 and 5 enable it to be reduced in quantity or entirely cut off, if desired. The shafts of these turbines are coupled to the rotors of the induction generators 6 and 7, one of which, as 6, has a closed winding on its rotor 8, preferably of the squirrel cage type. The winding of the rotor of the other generator, 7, is of the three-phase type, mounted on a laminated core, and provided with slip rings 9 mounted on and rotating with the shaft of said rotor. A switch 10 is provided for connecting all of said slip rings together, in order to close-circuit the winding on the rotor. The stators of these generators are provided with the usual three-phase winding, and leads 11 connect the stator of the generator 7 with mains 12 connected with the propelling motors. Leads 13 extend from the generator 6 and may be connected by the double throw switch 14 either to the slip rings 9 or to the leads 11, at will. Inasmuch as these generators 6 and 7 cannot of themselves, when their rotor windings are short-circuited, act as alternating current generators, I have provided a third or auxiliary generator 15, of the three-phase synchronous type, whose phases act to set the phases in the generators 6 and 7 when necessary. The rotor of the auxiliary generator is of the usual polar type excited by a direct-current exciter 16, whose voltage can be varied by adjusting its field strength or by inserting more or less resistance into its armature circuit, or both. Means for doing this are conventionally shown in the drawing at 17.

The rotating field magnet of the auxiliary generator 15 is driven by an independent motor, such as the auxiliary steam turbine 18, the speed of which may be adjusted and varied to any desired degree by suitable means, such as an adjustable governor or throttle.

The mains 12 are connected to the stators of both of the propelling motors 19 and 20, which have short circuited rotors mounted on the shafts of the propeller screws 21 and 22. The stator windings of these motors will naturally be chosen and connected correspondingly with the three-phase generator circuits, but the winding will, as a rule, be provided with more poles than the generators, because said motors are to run at a lower speed. Open-circuiting and phase interchanging switches are indicated symbolically at 23 and 24 whereby either motor may be cut off from the mains 12, or a pair of phases of either motor may be interchanged so as to reverse the direction of rotation. Such switches are sufficiently well known and need not be described in detail here. It is preferable that all the control switches in the system be controllable from some central point by means well known to the electrical engineer.

The operation is as follows:—For the highest speed of the propeller screws and for the heaviest duty both turbines 2 and 3 are supplied with steam and are governed suitably to secure high economy of production of power. In this case, the short-circuiting switch 10 is closed so as to short-circuit the rotor winding of the generator 7, and the switch 14 is thrown over to connect the leads 13 to the leads 11, coming from the generator 7 to the propelling motors. The connections are of course made to correspond as to succession of phases, so that both generators may work in parallel in furnishing the current to the motor circuit. The auxiliary generator 15, being a synchronous machine and feeding into the mains with the generator 6 and generator 7 coupled as set forth above, sets the frequencies and causes these machines to act as induction generators, delivering energy into the system, with the phase relation and frequency set by the synchronous machine 15. Now as this machine is driven by a motor which is capable of being varied in speed, it will be seen that the frequency of the system can be thus at the same time varied, and in consequence thereof the generators 6 and 7 become generators with variable frequency, while the propelling motors 19 and 20, receiving these currents of varying frequency, vary their speed correspondingly.

Considerable variation of speed may thus be obtained, but it is possible not to rely upon such variation of frequency for all the changes of speed required. Hence, under low loads and low speeds of driving, the arrangement is differently made. The switch 14 is thrown into the position shown in the drawing, and the switch 10 is also thrown into the position shown, open circuiting the slip rings so far as switch 10 is concerned, but connecting them correspondingly with the leads 13 from the generator 6; the leads 11 from the generator 7 being the only ones connected to the windings of the propelling motors 19 and 20. In this case, as before, the synchronous machine 15 sets the frequencies for the system, and can be made to vary the frequency of the currents therein, but the electric currents generated by the generator 6 now act to excite the generator 7, that is they pass through the switch 14 in corresponding phase relation to the slip rings 9 connected to the three-phase winding of the rotating part of the generator 7, and the currents developed in generator 7 pass through the leads 11 and mains 12 to the motors 19 and 20. The generators 6 and 7 may be said to be now running in concatenation, the generator 6 driving the rotating part of the generator 7 and dividing the speed such that a low frequency is developed in the outside circuit of the generator 7. The turbine 3, in this case, may be shut off altogether, or considerably throttled down. For the sake of economy it should be left connected with the condenser, so as to run *in vacuo*. In this new relationship of the parts, the variation of frequency given by the synchronous machine 15 again comes into play and enables a further speed variation of the propeller screws 21 and 22 to be secured.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. In a system of the character described, the combination of polyphase generators of the induction type, said generators having stationary armatures and rotating fields that are mounted on separate shafts, an auxiliary synchronous generator for fixing the frequencies of the poyphase generators, means for varying the speed of the auxiliary generator, electrical connecting means for connecting the main generators to operate as induction generators in parallel under certain conditions, and means for connecting the main generators in concatenation so that one generator operates as an excited field generator for other conditions of operation.

2. In a system of the character described, the combination of polyphase generators of the induction type, said generators having stationary armatures and rotating fields that are mounted on separate shafts, an auxiliary synchronous generator for fixing the frequencies of the polyphase generators, means for variably governing the auxiliary generator, electrical connecting means for connecting the main generators to operate as induction generators in parallel under certain conditions, and electrical connecting means for connecting the main generators in concatenation so that one generator operates as an excited field generator for other conditions of operation.

3. In a system of the character described, the combination of polyphase generators of the induction type having stationary armatures and rotating fields that are mounted on separate shafts, an auxiliary synchronous generator for setting the frequencies of the main generators, electrical connecting means for connecting the armatures of the main generators in parallel for full load operation, devices for disconnecting one armature from said parallel arrangement and connecting it to the field of the other generator to operate the latter as an excited field generator to supply current under light load operation, and a device for opening and closing the circuit of the field winding of said other generator.

In witness whereof, I have hereunto set my hand this tenth day of January, 1911.

ELIHU THOMSON.

Witnesses:
 JOHN A. MCMANUS, Jr.,
 CHARLES A. BARNARD.